United States Patent Office 2,694,642
Patented Nov. 16, 1954

2,694,642

THIAMIN-ENRICHED ALIMENTARY PASTE

Kurt Westphal, Hans Andersag, and Grete Widmann, Wuppertal-Elberfeld, Germany, assignors to Schenley Industries, Inc., New York, N. Y., a corporation of Delaware No Drawing. Application November 21, 1950, Serial No. 196,959

Claims priority, application Germany December 5, 1949

3 Claims. (Cl. 99—85)

This invention relates generally to novel chemical compounds, together with a process for preparing the same, and, more particularly, it relates to a novel growth-promoting agent suitable for use in the enrichment of foodstuffs.

The desirability of enriching foodstuffs with growth-promoting agents, either of natural origin or resulting from synthesis, is now universally recognized and a considerable knowledge of the problems arising in this connection has been gained as the result of long experience. It has been found that a satisfactory treatment of widespread dietary deficiencies, as regards the common water-soluble vitamins of the B group, may be readily achieved by using growth-promoting agents as supplements in those foodstuffs which occupy a significant position in the usual diet of the deficient population group. Farinaceous substances, in one form or another, usually are found to constitute a prime component in the diet of all of the races of mankind and, for this reason, the addition of growth-promoting agents to farinaceous substances has received the most careful consideration from workers in this field and this has been the most widely investigated member of the various types of enriched foodstuffs. These investigations have included studies of a wide variety of substances, not merely the addition of enriching agents to flours, meals, cereals and the like that normally are cooked by baking or roasting, but also the enrichment of those farinaceous substances that commonly are cooked by heating in water, such as noodles, spaghetti, macaroni, ravioli and numberless other kindred foodstuffs of this type. The present invention is concerned with a novel growth-promoting agent that is particularly suited for use, as an additive material, in the enrichment of that type of farinaceous substances that is cooked by heating in water.

The growth-promoting agents of the water-soluble vitamin B group are relatively labile substances that lose at least a substantial amount of their characteristic physiological activity upon exposure to high temperatures, particularly when in the presence of moisture. It is obvious, therefore, that an agent suitable for use in the enrichment of a farinaceous foodstuff of the type which is cooked by heating in water must satisfy two primary requirements if the enriching agent is to be available in the foodstuff after cooking: first, the enriching agent must be in a form which resists inactivation by heat under the conditions used when cooking the foodstuff, and, second, the enriching agent must resist the leaching action of the water in which the foodstuff is cooked.

Of the several vitamins of the B group, the most important, because of wide-spread dietary deficiency of this substance, especially in the tropics, and the effects of this deficiency upon human nutrition, is the antineuritic, anti-beriberi vitamin, variously designated thiamin in the United States, aneurin in Europe. The forms of this vitamin usually used as a foodstuff enriching agent are either the naturally occurring vitamin or the synthetically produced thiamin chloride hydrochloride, but, unfortunately, when thus used, the physiological activity of the additive soon is diminished largely, if not wholly destroyed, during usual storage conditions, thereby necessitating the use of a large excess of the agent. Furthermore, if the enriched foodstuff is of a type that is cooked by heating in water, the combined effects of heating and leaching are to reduce still further the amount of additive remaining in the foodstuff, thereby defeating the purpose of using the enriching agent. Heretofore, it has been thought to be necessary, even though undesirable because of cost, to incorporate large excesses of additive in foodstuffs of this type in order that an effective quantity of the vitamin may be present in the foodstuff when consumed, and therefore a need has been felt for a physiologically active, non-toxic form of thiamin which would be stable under ordinary conditions of storage and which would not be destroyed or materially leached from the foodstuff during cooking.

It has been proposed to use certain mono salts of thiamin, particularly the mono-nitrate, the mono-iodide and the mono-bromide, as enriching agents for farinaceous foodstuffs, primarily because these salts were found to be less subject to deterioration of physiological activity upon storage, but these salts, like the chloride hydrochloride salt, are sufficiently water-soluble that they are leached from the foodstuff if it is cooked by heating in water.

One of the chief objects of the present invention is to fill this need by providing a stable, non-toxic thiamin compound, having the full complement of physiological activities that are characteristic of the vitamin, and which has so limited a water-solubility that it resists leaching when used in the enrichment of foodstuffs of the type cooked by heating in water.

In accordance with this invention, a farinaceous foodstuff is enriched with the normal thiamin salt of naphthalene-1:5-disulfonic acid, represented by the empirical formula

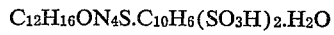

$$C_{12}H_{16}ON_4S \cdot C_{10}H_6(SO_3H)_2 \cdot H_2O$$

This novel enriching agent for foodstuffs can be prepared by mixing an aqueous solution containing thiamin, which may be in the form of a common salt such as thiamin chloride hydrochloride, with an aqueous solution of naphthalene-1:5-disulfonic acid, whereupon the sparingly soluble thiamin naphthalene-1:5-disulfonate forms and separates from the solution as a crystalline precipitate. The product so obtained, when using pure starting materials, is of a degree of purity such that it need not be purified prior to use. In contrast to thiamin chloride hydrochloride, which is fully soluble in approximately its own weight of water, about 1500 parts by weight of water are required to dissolve one part by weight of thiamin naphthalene-1:5-disulfonate. The physiological activity of this novel salt, when it was incorporated as an enriching agent, in the usual manner, in rye or wheat flour, was found to be fully retained when stored at 0° C. and at about 50° C. (ca. 122° F.) for a period of 10 days.

The principles of this invention are illustrated in the following example.

A sample of wheat flour weighing about 10 grams was mixed with about 50 milligrams of thiamin naphthalene-1:5-disulfonate to produce a homogeneous mixture. Samples of this mixture were stored for a period of 10 days under temperature-controlled conditions, one group of samples being stored at 0° C. and the other group of samples being stored at about 50° C. The samples therein were assayed to evaluate their thiamin activity and it was found that all the samples had retained the full measure of activity which they initially possessed. Control samples in which the enriching agent was thiamin chloride hydrochloride, when stored under the same conditions, were found to have lost sixty per cent of their initial activity in 10 days at 50° C.

The thiamin naphthalene-1:5-disulfonate to be used as an enriching agent in foodstuffs as above described, can be prepared by mixing a solution containing 10 grams of thiamin chloride hydrochloride in about 100 cc. of water with a solution of 10 grams of naphthalene-1:5-disulfonic acid in about 100 cc. of water, cooling the mixture and recovering therefrom thiamin naphthalene-1:5-disulfonate which forms as a crystalline precipitate.

In the following claims the term "farinaceous foodstuff" defines a starchy foodstuff of vegetable origin which can be in powdered state, such as flour, or which can be in processed form, such as spaghetti, noodles, and the like. In reciting that the enriched foodstuff is stable under usual storage conditions, it is meant that the enriching agent retains the physiological activity that is characteristic of thiamin when the foodstuff is stored at ordinary room temperature for a reasonable period of time.

What is claimed is:

1. An enriched alimentary paste type foodstuff, stable under usual storage conditions, that comprises an essentially homogeneous mixture of a farinaceous material with a relatively small proportion of thiamin naphthalene-1:5-disulfonate.

2. An enriched alimentary paste type foodstuff of the type that is usually cooked by heating in water, stable under usual storage conditions, that comprises an essentially homogeneous mixture of a farinaceous material with a relatively small proportion of thiamin naphthalene-1:5-disulfonate.

3. An enriched alimentary paste type foodstuff, stable under usual storage conditions, that comprises an essentially homogeneous mixture of a farinaceous material with a relatively small proportion of thiamin naphthalene-1:5-disulfonate, characterized in that the foodstuff retains the thiamin salt when cooked by heating in water.

References Cited in the file of this patent

UNITED STATES PATENTS

| Number | Name | Date |
|---|---|---|
| 1,349,524 | Miner | Aug. 10, 1920 |
| 1,434,498 | Miner | Nov. 7, 1922 |
| 2,328,595 | Williams | Sept. 7, 1943 |
| 2,441,409 | Green | May 11, 1948 |
| 2,540,302 | Steher et al. | Feb. 6, 1951 |

FOREIGN PATENTS

| Number | Country | Date |
|---|---|---|
| 522,418 | Great Britain | June 18, 1940 |
| 544,360 | Great Britain | Oct. 8, 1940 |